Aug. 15, 1967  B. EDWARDS  3,335,901

THERMOPLASTIC CLOSURE

Filed Dec. 8, 1965

INVENTOR.
Bryant Edwards
BY Michael Howe
Robert W. Beart
His Att'ys

United States Patent Office 3,335,901
Patented Aug. 15, 1967

3,335,901
THERMOPLASTIC CLOSURE
Bryant Edwards, Clarendon Hills, Ill., assignor to Illinois Tool Works Inc., Chicago, Ill., a corporation of Delaware
Filed Dec. 8, 1965, Ser. No. 512,377
7 Claims. (Cl. 220—60)

The present invention relates to a new and improved closure or lid removal means, and more particularly, to a closure or lid removal means particularly suited to a tight-fitting thermoplastic closure member.

Various techniques have been employed to remove a closure member from a container body. It is known, for example, to incorporate finger tab, lift knob, tear strip features and the like in a closure member to facilitate its removal from a container body. While these features have served well in many instances, different considerations must be given to the removal of thin-wall thermoplastic closures which are extremely fragile in nature, and not ordinarily susceptible to score lines, particularly where such closures are designed for tight-fitting engagement with a complementary container body. A tight-fitting thin-wall thermoplastic closure member may make removal by conventional finger tabs, lift knobs and the like quite difficult, and the adoption of a tear strip feature or the like in such a case may prove to be impractical.

Accordingly, it is an object of the present invention to provide a closure removal means in a thin-walled thermoplastic closure member which is designed for tight-fitting engagement with a complementary container body.

Another object of the present invention is the provision of a closure removal means in a thermoplastic closure member which changes the contour of the closure member relative to the container body with which it is to be associated for easy removal thereof.

A further object of the present invention is the provision of a thermoplastic closure member which, in addition to the aforementioned objects, is stackable with a plurality of similarly configured closure members in non-jamming relationship, easily assembled and disassembled from a complementary container body, and economically manufactured by conventional thermoforming techniques at a relatively low cost.

These and other and further objects of the present invention are attained by the provision of a thermoplastic closure member having an upstanding finger engaging ring or portion which affords substantial leverage in changing the relative contour of the closure member to facilitate ready removal from a container body.

Reference is now made to the drawing wherein.

Figure 1:
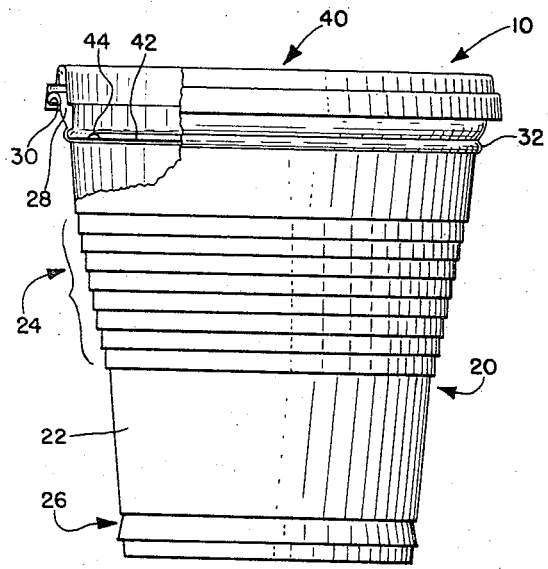
FIG. 1 is a side elevational view of a container package, partly in section, illustrating the preferred form of closure member incorporating the features of the present invention.
Figure 2:
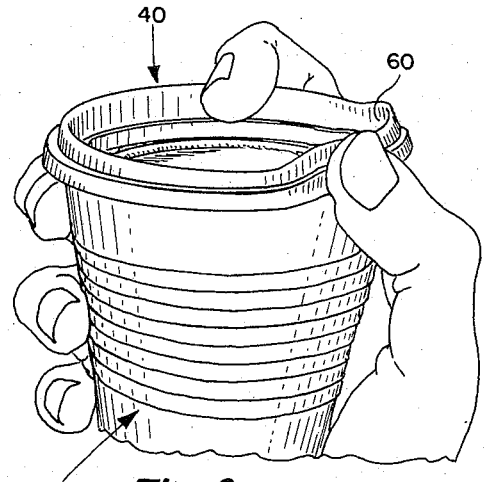
FIG. 2 is a fragmentary perspective view of the container package shown in FIG. 1 indicating the manner in which the preferred form of closure member is removed from its complementary container body.
Figure 3:
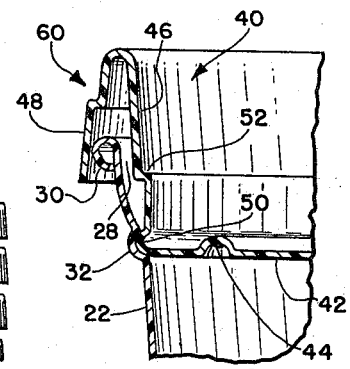
FIG. 3 is an enlarged fragmentary sectional view of the thermoplastic closure member of the present invention as assembled to a complementary container body.

Referring now to the drawings, and first to FIGS. 1–3, there is shown a container package 10 including a container body 20 and a lid or closure member 40, both of which are preferably made from thermoplastic materials such as polystyrene, polyethylene and other similar plastic materials. Both the container and closure can be easily and economically formed by conventional thermoforming techniques as one-piece seamless articles of thin-wall nature so as to compete with their paper, and wax impregnated paper counterparts.

The container body 20 is generally of the type shown in U.S. Patent No. 2,905,350 in that it comprises a frusto-conical hollow body member having a sidewall 22 provided with a serrated finger gripping band portion 24 generally in the mid-portion thereof, and a stacking ring construction 26 in the lower area of the sidewall. The sidewall tapers outwardly as it proceeds upwardly from the container bottom wall and terminates in an open upper end or open mouth 28 which is surrounded by a radially projecting rim 30, preferably in the form of a rolled over lip. A lid seat in the form of a circumferentially extending, inwardly facing groove 32 is provided in the sidewall just slightly below the radially projecting lip 30. The lid seat 32 will cooperate with the closure 40 as will be set forth in detail hereinafter.

Although the container 20 just described is preferably employed with the closure 40 to be presently discussed, it will be understood that various other container constructions are possible, it only being necessary to provide some form of lid seat for cooperatively retaining the closure member.

The closure 40 is adapted to be positioned and retained adjacent the open upper end 28 of the container body 20 to protect the contents thereof, and for this purpose is provided with a bottom or end wall 42 to cover or close off the open mouth of the container in the vicinity of the lid seat 32. A circumferentially extending strengthening and reinforcing bead 44 is spaced radially inwardly a short distance from the outer marginal edge of the bottom or end wall 42 to reinforce the rather large extent of the end wall. A peripherally continuous sidewall 46 extends upwardly away from the bottom or end wall 42, and terminates in a radially outwardly offset depending skirt portion 48.

In the vicinity of the juncture between the end and sidewalls 42, 46 respectively, there is provided, as best seen in FIG. 3 of the drawing, a circumferentially extending radially outwardly directed curvilinear bead means 50 which is complementary to the container lid seat 32. The relative curvature or configuration between the container groove 32 and the closure bead 50 is such that there will be a tight-fitting engagement of the closure and container when assembled to each other. This coaction will establish a sealed relationship between the closure and container so as to protect the container contents from the entry of air, foreign particles and the like.

Figure 4:
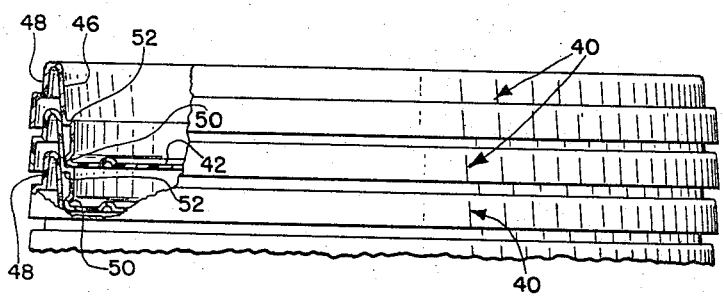
FIG. 4 is a fragmentary elevational view, partially in section, of a plurality of similarly configured closure members constructed in accordance with the principles of the present invention stacked one atop the other.

In generally the mid portion of the sidewall 46, an internal shoulder or shelf 52 is provided for coaction with the bead means 50 of a superposed similarly configured closure member for supporting a plurality of closure members 40 in stacked relationship as is illustrated in FIG. 4 of the drawing. It will be noted that the external stacking shoulder or shelf 52 is of smaller minimum diameter than the maximum diameter of the external shoulder or bead means 50 to positively limit the extent of telescopic association of stacked closure members as illustrated. The stacking height of each closure member, that is, the axial distance between the external and internal shoulders 50, 52 respectively of each closure member is preferably large enough to maintain the depending skirt portions 48 of adjacent closures out of contact with one another as illustrated in FIG. 4.

As an important aspect of the present invention, at least a part of the sidewall 46 and the depending skirt portion 48 extends upwardly for a sufficient predetermined distance beyond the open upper end 28 of the container body 20 when the closure member is assembled thereto to provide an upstanding finger engaging portion 60. In the embodiment shown in FIGS. 1–4, this upstanding finger engaging portion is circumferentially continuous throughout the entire circumferential extent of the closure. More particularly, and as best seen in FIG. 3 of the drawing, the sidewall and depending skirt portions 46, 48 which extend above the open upper end 28 of the container body each have a substantial axial height to provide an upstanding leverage ring of sufficient size to be engaged by the thumb of a user as illustrated in FIG. 2. Then, upon the application of a predetermined amount of force in a generally radially inward direction, the contour of the closure member 40 will be changed relative to its complementary container body to cause disengagement of the closure locking means in the form of the radially projecting bead 50 in the FIGS. 1–4 embodiment. There will thus be an easy removal of the closure member from its complementary container body.

It is to be noted that the depending skirt portion 40 is preferably of sufficient axial length to engage the projecting lip 30 as best seen in FIG. 3 to provide several laterally offset sealing points between the closure and container. Further, the engagement between the depending skirt 48 and the projecting lip 30 will afford lateral strength to the upstanding finger engaging portion or leverage ring 60 while serving as somewhat of a sliding fulcrum point therefor as it is subjected to a radially inwardly directed force.

Reference to FIG. 2 of the drawing will indicate the preferred manner of disassociating the closure member from the container body. It will there be seen that a user's hand may readily grasp the container package while the user's thumb exerts pressure in a generally radially inward direction against the upstanding finger engaging portion or leverage ring 16 to change the contour thereof as has been previously indicated.

Various modifications of the present invention are possible as, of course, will be understood. In this connection, attention is directed to FIGS. 5–6 of the drawing for one modified form of the present invention. Identical reference numerals are employed with the suffix *a* to designate like parts in the various respective figures. The container package 10*a* is generally the same as the one shown in FIGS. 1–3 with the exception that there are one or more discrete finger engaging portions 60*a*. Each of these finger engaging portions 60*a* are formed by an upward extension of only a part of the sidewall and depending skirt portion 46*a*, 48*a* respectively rather than a circumferentially continuous extent as in the FIGS. 1–4 embodiment. An embodiment of this type with one or more discrete upstanding finger engaging portions 60*a* provides a visual indication to a user of the area or areas to be engaged.

Figure 5:
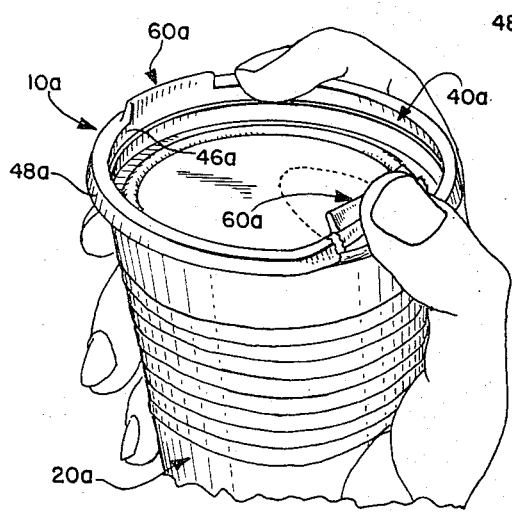
FIG. 5 is a fragmentary perspective view of a modified form of closure member indicating the manner in which the same is removed from a complementary container body.

In removing a closure member 40*a* from the container 20*a*, the same procedure as heretofore outlined is adopted with the user's thumb engaging one of the upstanding finger engaging portions or leverage rings 60*a*. With pressure applied against the upstanding portion or ring 60*a*, there is a distinct possibility that it will tear or separate along the outer marginal portions thereof as illustrated in FIG. 5 due to the fragile, thin-wall nature of the closure and the discrete character of each of the portions or rings 60*a* as compared with the remaining parts of the closure. It has been found that where the upstanding portion or ring 60*a* has separated or torn away from the remainder of the closure, there is a distinct possibility that a section of the closure member will be separated from the remainder thereof as the closure removed from the container body. The phantom or dotted line in FIG. 5 indicates the general path along which separation is most likely to occur, although this will vary as will be appreciated. It will also be understood that there will be instances where no tearing will take place, or if there is any tearing or separation it will be relatively small and occur only in the depending skirt and sidewall portions of the closure. In any case, the closure member 40*a* is easily and quickly removed from its complementary container body 20*a* as will be appreciated.

Figures 6, 7:
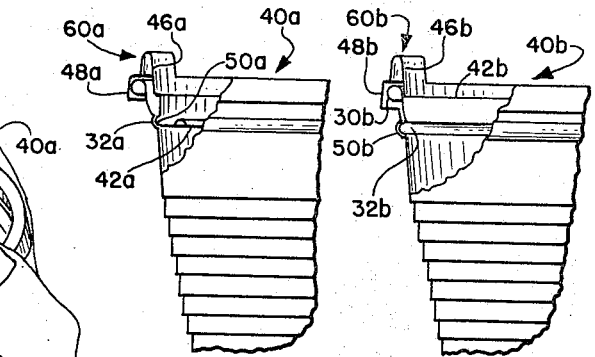
FIG. 6 is a fragmentary elevational view, partially in section, illustrating the assembly of the modified closure member shown in FIG. 5 to a complementary container body.
FIG. 7 is a fragmentary sectional view of a modified form of closure member assembled to a complementary container body, and coming within the purview of the present invention.

Reference is now made to FIG. 7 of the drawing for the last illustrated embodiment of the present invention wherein identical reference numerals are employed in view of the similarity with the other embodiments, but with the suffix *b* to distinguish therefrom. The marked difference between the closure member 40*b* is that the depending skirt portion 48*b* carries the locking means 50*b* generally at the lower end thereof which is shown to be in the form of an inwardly opening groove. The groove 50*b* cooperates with the radially outwardly directed lid seat or bead means 32*b* in the same manner as the above described embodiment in that when associated with one another they releasably maintain the closure and container body to each other until closure removal is effected. The upstanding finger engaging portion or leverage ring 60*b* in the FIG. 7 embodiment may be either circumferentially continuous or interrupted generally in the manner of the FIGS. 1–4 or 5–6 embodiment as desired. The portion or ring 60*b* is, as in the other embodiments, formed as an extension of part of the sidewall 46*b* and the depending skirt portion 48*b*.

It will be noted that in this last embodiment, the area in the vicinity of the juncture of the end wall and sidewall 42*b*, 46*b* respectively engages the container generally in the vicinity of the radially projecting lip 30*b* thereof in much the same manner as depending skirt 48 in the FIGS. 1–4 embodiment and the depending skirt 48*a* in the FIGS. 5–6 embodiment engage the radially projecting lip 30, 30*a* respectively. The manner of removing the closure 40*b* is identical with the previous embodiment in that pressure is exerted by user's hand against the upstanding portion or ring 60*b* in a radially inward direction.

It is recognized that various alterations as to the size, shape, relative size of various parts, etc. may be varied to suit the particulars desired. It will also be apparent that other types of closure locking means, stacking areas or rings, finger engaging portions or leverage rings and the like are possible and are contemplated by the present invention.

It is to be understood that the specific examples of the invention herein shown and described are for illustrative purposes only. Various changes in structure will no doubt occur to those skilled in the art, and will be understood as forming a part of this invention insofar as they fall within the spirit and scope of the appended claims.

I claim:
1. A one-piece thermoplastic closure member adapted to be positioned adjacent an open upper end of a complementary container body comprising, an end wall portion for covering the open upper end of said container body, a peripherally continuous sidewall portion extending upwardly away from said end wall and terminating in a laterally outwardly offset depending skirt portion, one of said sidewall or depending skirt portions being provided with locking means for releasably securing said closure member to said container body, at least a part of said sidewall and depending skirt portion extending upwardly for a sufficient predetermined distance beyond the open upper end of said container body when said closure member is assembled thereto to provide an upstanding finger engaging portion capable of changing the contour of said closure member relative to said container body when subjected to a predetermined amount of force in a generally radially inward direction and thereby cause disengagement of said locking means for removal of said closure member from said container body.

2. The closure member as set forth in claim 1 wherein said locking means comprises a circumferentially extending, radially offset bead means for cooperation with a complementary circumferential groove means provided in said container body.

3. The closure member as set forth in claim 1 wherein said locking means comprises a circumferentially extending groove means for cooperation with a complementary circumferential and radially offset bead means provided in said container body.

4. The closure member as set forth in claim 1 wherein one of said sidewall or depending skirt portions engages the open upper end of said container body on the opposite side thereof from said locking means.

5. The closure member as set forth in claim 1 wherein said sidewall is provided with stacking means including axially spaced internal and external shoulders, the external shoulder of said closure member being engaged by the internal shoulder of a subjacent similarly configured closure member to limit the degree of telescoping therebetween, the axial height of the stacking means being sufficient to maintain the sidewall and depending skirt portions of adjacent closure members spaced from one another.

6. The closure member as set forth in claim 1 wherein said sidewall and depending skirt portions extend upwardly from the open upper end of said container body as aforementioned at a plurality of circumferentially spaced areas to provide a series of discrete finger engaging portions.

7. In combination, a closure member and container body of the type defined in claim 1 wherein one of said closure member and container body is provided with venting means permitting the escape of air within said container body when said closure member is assembled thereto.

References Cited
UNITED STATES PATENTS 3,061,139    10/1962    Edwards     220—44
3,173,571    3/1965    Cserny et al.     220—60 X THERON E. CONDON, *Primary Examiner.*

G. T. HALL, *Assistant Examiner.*